US010126833B2

(12) United States Patent
Piquerez et al.

(10) Patent No.: US 10,126,833 B2
(45) Date of Patent: Nov. 13, 2018

(54) MULTI-FUNCTIONAL PORTABLE DEVICE CONTROLLED BY EXTERNAL INFORMATION

(71) Applicant: Soprod SA, Sion (CH)

(72) Inventors: Denis Piquerez, Martigny (CH); Romain Clivaz, Grone (CH)

(73) Assignee: SOPROD SA, Sion (CH)

( * ) Notice: Subject to any disclaimer, the term of this patent is extended or adjusted under 35 U.S.C. 154(b) by 116 days.

(21) Appl. No.: 14/759,301

(22) PCT Filed: Jun. 27, 2014

(86) PCT No.: PCT/EP2014/063738
§ 371 (c)(1),
(2) Date: Jul. 31, 2015

(87) PCT Pub. No.: WO2014/207220
PCT Pub. Date: Dec. 31, 2014

(65) Prior Publication Data
US 2015/0346843 A1 Dec. 3, 2015

(30) Foreign Application Priority Data

Jun. 27, 2013 (CH) ...................................... 1179/13

(51) Int. Cl.
*G04C 3/00* (2006.01)
*G04C 3/14* (2006.01)
(Continued)

(52) U.S. Cl.
CPC ............... *G06F 3/03* (2013.01); *G04G 21/04* (2013.01); *H04W 4/80* (2018.02); *G04C 3/14* (2013.01);
(Continued)

(58) Field of Classification Search
CPC .......... G04C 3/14; G04C 3/146; G04C 17/00; G04C 9/00; G04C 17/0066;
(Continued)

(56) References Cited

U.S. PATENT DOCUMENTS 4,351,042 A * 9/1982 Ginalski ................ G04G 19/12
368/188
4,420,263 A * 12/1983 Besson ................... G04G 7/00
368/157
(Continued)

FOREIGN PATENT DOCUMENTS

EP 1 220 062 A1 7/2002
EP 1 571 506 A1 9/2005

*Primary Examiner* — Michael J Eurice
(74) *Attorney, Agent, or Firm* — Pearne & Gordon LLP

(57) ABSTRACT

A multi-functional portable device including a display module driven by an actuator and configured to be able to display one or more display functions simultaneously or sequentially. A control unit is configured to receive outside information and control the display module according to said one or more display functions, based on the received outside information. The device also includes a computer medium including portions of code for a software application having a plurality of display functions, each of the display functions being configured to be executed in the multifunctional device.

22 Claims, 2 Drawing Sheets

(51) Int. Cl.
| | | |
|---|---|---|
| *G06F 3/03* | (2006.01) | |
| *G04G 21/04* | (2013.01) | |
| *H04W 4/80* | (2018.01) | |
| G04R 60/02 | (2013.01) | |
| G04R 20/14 | (2013.01) | |
| G04G 21/08 | (2010.01) | |
| G04G 5/00 | (2013.01) | |
| G04C 17/00 | (2006.01) | |
| G04R 60/14 | (2013.01) | |
| G04G 21/00 | (2010.01) | |
| G04G 9/00 | (2006.01) | |
| G04C 9/00 | (2006.01) | |
| G04C 13/10 | (2006.01) | |
| G04R 20/02 | (2013.01) | |
| G04R 20/26 | (2013.01) | |

(52) U.S. Cl.
CPC ............ *G04C 3/146* (2013.01); *G04C 9/00* (2013.01); *G04C 13/105* (2013.01); *G04C 17/00* (2013.01); *G04C 17/0066* (2013.01); *G04C 17/0091* (2013.01); *G04G 5/00* (2013.01); *G04G 9/00* (2013.01); *G04G 21/00* (2013.01); *G04G 21/08* (2013.01); *G04R 20/02* (2013.01); *G04R 20/14* (2013.01); *G04R 20/26* (2013.01); *G04R 60/02* (2013.01); *G04R 60/14* (2013.01)

(58) Field of Classification Search
CPC .. G04C 17/0091; G04C 13/105; G04G 21/04; G04G 21/00; G04G 21/08; G04G 9/00; G04G 5/00; G04R 20/14; G04R 20/02; G04R 60/02; G04R 60/14
See application file for complete search history.

(56) References Cited

U.S. PATENT DOCUMENTS

| | | | | | |
|---|---|---|---|---|---|
| 4,645,357 | A * | 2/1987 | Allgaier | ............ | G04C 3/14 368/184 |
| 4,845,485 | A * | 7/1989 | Pace | ............ | G08B 3/1016 340/7.38 |
| 4,884,252 | A * | 11/1989 | Teodoridis | ............ | H01Q 1/44 368/10 |
| 4,947,179 | A * | 8/1990 | Ganter | ............ | H01Q 1/273 343/718 |
| 5,119,349 | A * | 6/1992 | Muto | ............ | G04C 17/00 368/107 |
| 5,253,226 | A * | 10/1993 | Ganter | ............ | G04G 21/04 368/10 |
| 5,270,993 | A * | 12/1993 | Besson | ............ | G04C 3/14 368/184 |
| 5,299,177 | A * | 3/1994 | Koch | ............ | G04C 3/14 368/28 |
| 5,329,501 | A * | 7/1994 | Meister | ............ | G04G 21/04 340/7.53 |
| 5,696,518 | A * | 12/1997 | Itoh | ............ | G04G 21/04 343/718 |
| 5,737,699 | A * | 4/1998 | Farrar | ............ | G04G 21/04 368/10 |
| 5,798,984 | A * | 8/1998 | Koch | ............ | G04G 21/04 343/718 |
| 6,038,523 | A * | 3/2000 | Akahane | ............ | G01D 5/2492 368/250 |
| 7,081,905 | B1 * | 7/2006 | Raghunath | ............ | G04G 5/00 345/684 |
| 9,141,089 | B1 * | 9/2015 | Liou | ............ | G04R 60/14 |
| 2002/0115478 | A1 * | 8/2002 | Fujisawa | ............ | H04M 1/6505 455/567 |
| 2003/0112708 | A1 | 6/2003 | Fujisawa | | |
| 2004/0042345 | A1 | 3/2004 | Kawaguchi | | |
| 2004/0052161 | A1 | 3/2004 | Liao | | |
| 2004/0233788 | A1 * | 11/2004 | Plancon | ............ | G04B 19/082 368/11 |
| 2004/0233791 | A1 * | 11/2004 | Plancon | ............ | G04B 19/082 368/80 |
| 2007/0070822 | A1 | 3/2007 | Booty | | |
| 2007/0120758 | A1 * | 5/2007 | Takahashi | ............ | G04G 21/04 343/788 |
| 2007/0271513 | A1 * | 11/2007 | Andren | ............ | G04G 9/0064 715/703 |
| 2009/0016168 | A1 | 1/2009 | Smith | | |
| 2009/0016172 | A1 * | 1/2009 | Fujii | ............ | G04C 3/14 368/80 |
| 2009/0196124 | A1 * | 8/2009 | Mooring | ............ | G04B 37/005 368/204 |
| 2009/0201769 | A1 * | 8/2009 | Miyahara | ............ | G04G 21/04 368/10 |
| 2010/0112964 | A1 * | 5/2010 | Yi | ............ | G04G 21/04 455/90.3 |
| 2011/0310708 | A1 * | 12/2011 | Chen | ............ | G04G 5/00 368/46 |
| 2012/0002511 | A1 * | 1/2012 | Matsuzaki | ............ | G04G 21/04 368/10 |
| 2012/0320715 | A1 * | 12/2012 | Maruyama | ............ | G04R 60/12 368/10 |
| 2012/0320717 | A1 * | 12/2012 | Sano | ............ | H01Q 1/273 368/47 |
| 2013/0064045 | A1 * | 3/2013 | Essery | ............ | H04W 88/02 368/47 |
| 2013/0201802 | A1 * | 8/2013 | Born | ............ | G04B 27/007 368/185 |
| 2013/0272099 | A1 * | 10/2013 | Yang | ............ | G04R 40/00 368/13 |
| 2014/0045547 | A1 * | 2/2014 | Singamsetty | ......... | G06F 1/1643 455/552.1 |
| 2014/0171055 | A1 * | 6/2014 | Oshita | ............ | H04W 4/12 455/418 |
| 2014/0192626 | A1 * | 7/2014 | Wolff | ............ | G04G 13/025 368/63 |
| 2014/0232603 | A1 * | 8/2014 | Fujisawa | ............ | G04R 60/12 343/702 |
| 2015/0092521 | A1 * | 4/2015 | Fujisawa | ............ | G04G 5/002 368/47 |
| 2015/0185707 | A1 * | 7/2015 | Liou | ............ | G04R 60/14 368/47 |
| 2015/0346843 | A1 * | 12/2015 | Piquerez | ............ | H04W 4/008 345/156 |
| 2015/0362893 | A1 * | 12/2015 | Masserot | ............ | G04G 5/00 368/4 |
| 2016/0057268 | A1 * | 2/2016 | Jiang | ............ | H04B 5/00 455/556.1 |
| 2016/0134737 | A1 * | 5/2016 | Pulletikurty | .......... | G06F 3/0227 715/735 |
| 2016/0238996 | A1 * | 8/2016 | Wautier | ............ | G04R 20/30 |
| 2016/0327915 | A1 * | 11/2016 | Katzer | ............ | G04B 19/04 |
| 2017/0040701 | A1 * | 2/2017 | Hanabusa | ............ | H01Q 7/00 |

* cited by examiner

MULTI-FUNCTIONAL PORTABLE DEVICE CONTROLLED BY EXTERNAL INFORMATION

TECHNICAL FIELD

The present invention relates to a multi-functional portable device comprising a display module configured to be able to display one or more display functions simultaneously or sequentially and controlled by external information. The present invention also relates to a multi-functional portable device comprising a control unit configured to receive external information and control the display module. The present invention also relates to a method for controlling the multi-functional portable device.

STATE OF THE ART

Multi-function watches that allow a variety of operation modes are known. For example, electronic watches often have functions of the type current time, alarm, wakeup alarm and stopwatch. However, the input and display capacity of most watches is limited by the space available and due to the user's dexterity.

In order to extend this capacity, menu systems can be implemented that enable the user to sequentially select the parameters for configuring the watch in order to make it work according to a given function. Such menu systems very quickly become complex when several functionalities are to be programmed and navigating within the menus can take a lot of time and be counter-intuitive.

BRIEF SUMMARY OF THE INVENTION

One aim of the present invention is to propose a multi-functional portable device free from the limitations of the known devices.

Another aim of the invention is to propose a device according to the preamble of the first claim, wherein one or several functions are selected through an input that is external to the device.

According to the invention, these aims are achieved notably by means of a multi-functional portable device comprising a display module driven by an actuator and configured to be able to display one or more display functions simultaneously or sequentially and a control unit; the control unit being configured to receive external information and control the display module according to said one or more display functions, based on the received external information.

According to one embodiment, the device comprises a remote control device allowing users to select the function or functions they wish to see executed on the multi-functional device and to generate the corresponding external information.

The external information is transmitted between the remote control device and the multi-functional device by means of a wireless connection module comprising optical or radio wave communication means, notably using the Bluetooth® transmission protocol, and preferably Bluetooth® Low Energy.

According to another embodiment, the device further comprises a computer medium comprising portions of code for a software application configured to be executed in a multifunctional device so as to manage the inputting of the function or functions and the generating of the external information associated with the selected function or functions.

This solution has notably the advantage over the prior art of limiting the inputs on the multi-functional device and allowing the functions to be selected more easily.

BRIEF DESCRIPTION OF THE FIGURES

Examples of embodiments of the invention are indicated in the description illustrated by the attached figures in which.

EXAMPLE(S) OF EMBODIMENTS OF THE INVENTION

Figure 1:
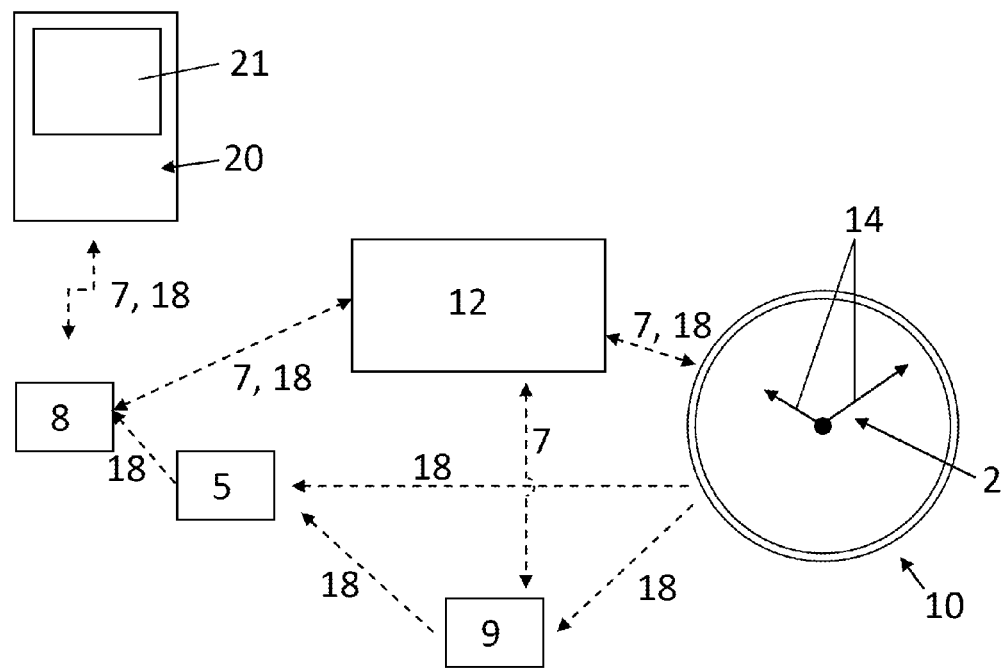
FIG. 1 shows schematically a multi-functional portable device comprising a display module controlled by a control unit, according to one embodiment.

FIG. 1 represents schematically a multi-functional portable device 10 according to one embodiment. The multi-functional portable device 10 comprises a display module 2. In the example of FIG. 1, the multi-functional portable device 10 is a timepiece and the display module 2 is of the analog type 14. The multi-functional portable device 10 is configured so as to be able to display one or several display functions simultaneously or sequentially. For example, the multi-functional portable device 10 can be configured to display successively, by means of the display module 2, a classic time function and a stopwatch function.

The multi-functional portable device 10 comprises a control unit 12 configured to receive external information 7 and control the display module 2 according to said one or several display functions, on the basis of the external information 7 received.

Figure 2:
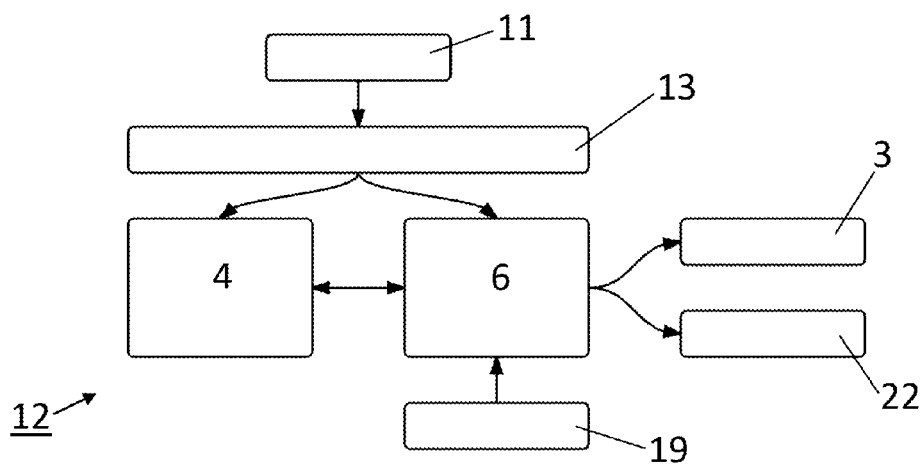
FIG. 2 shows a detail of the control unit according to one embodiment.

FIG. 2 shows a detail of the control unit 12 according to one embodiment. In particular, the control unit 12 comprises an actuator 3 driving the display module 2 and a control module 6 controlling the actuator 3. A receiving unit 4 communicating with the control module 6 is designed to receive the external information 7 and transmit it to the control module 6. The external information 7 comprises selecting said one or more display functions so that the control module 6 having received this information 7 can control the display module 2 according to the display function or functions selected. The control unit 12 further comprises a connector 11 and one or several inputs 19 that can be connected to one or several control mechanisms, such as push-buttons, crowns etc., and/or sensors, such as an accelerometer, magnetic sensor, pressure sensor etc.

In one embodiment, the external information 7 is generated by a remote control device 20. The remote control device 20 comprises input means 21 enabling users to select the function or functions they wish to see be executed on the multi-functional portable device 10. The remote control device 20 can comprise a mobile telephone, a PC, a numeric tablet, a console or any other device comprising input means and capable of transmitting the external information 7 to the multi-functional portable device 10. In a preferred manner, the remote control device 20 is a mobile phone of the type "smartphone".

A wireless connection module 8 makes it possible to transmit the external information 7 between the remote control device 20 and the receiving unit 4 of the multi-functional portable device 10.

In one embodiment, the control unit 12 is comprised in the remote control device 20.

In the case of a watch application, it is advantageous for the components forming the multi-functional device portable 10 to be able to function at low power. For example, the control module 6 can comprise a microcontroller adapted for low-energy embedded applications. The wireless connection module 8 can comprise communication means based for example on the standard IEEE 802.15.4, such as Bluetooth®, or on the standard IEEE 802.11, such as WiFi means. The wireless connection module 8 can also comprise any optical or radio wave communication means, infrared radiation communication means known by the acronym IrDA or even near field communication (NFC). The wireless connection module 8 preferably uses a Bluetooth® communication protocol and even more preferably a Bluetooth® Low Energy (BLE). The multi-functional portable device 10 can also comprise a power management unit 13. The power management unit 13 can typically comprise a battery in combination with a charge management device and a voltage regulator (not illustrated).

Figures 3A, 3B:
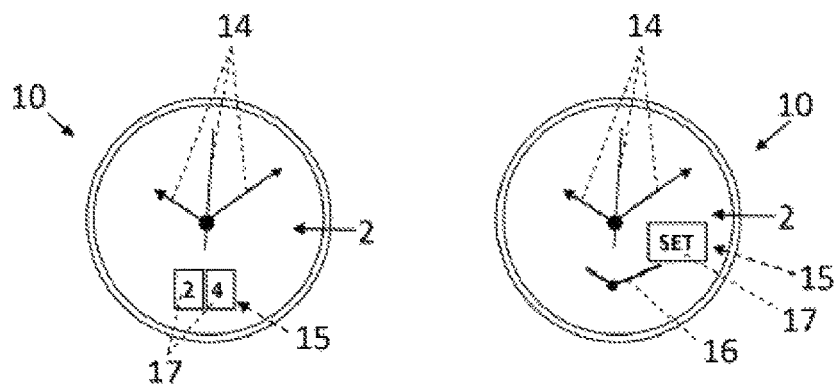
FIGS. 3a, 3b, and 3c illustrates different display modules of the multi-functional device according to one embodiment.
Figure 3C:
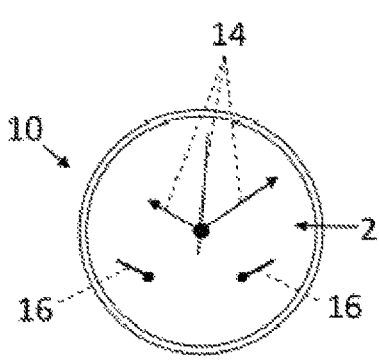

FIGS. 3a, 3b, and 3c illustrate different display modules 2 of the multi-functional portable device 10, represented in the form of an analog watch display. In the example of FIG. 3a, the display module 2 comprises the hour, minutes and seconds hands 14 as well as rotating discs 17, each bearing indications opposite an opening 15. Such a display makes it possible to display for example a classic time function in addition to functions such as stopwatch and calendar. In the examples of FIGS. 3b and 3c, the rotating disk 17 and the additional hands 16 enable for example regulation, countdown, counting functions etc. to be displayed.

Said one or more functions can comprise notably one or a combination of the following functions: indexing, synchronizing, regulating, stopwatch, countdown, point counting, score keeping, occurrence counting, wakeup alarm, prayer hours, programmable alarms, time zones, civil calendars, religious calendars, moon calendar, sun calendar, astrological events, astronomical events, block times (pilots), battery state or mission calendar. Said one or more functions can of course also comprise any other function that can be used on a watch.

In the examples of FIGS. 3a, 3b, and 3c, the actuator 3 can comprise several stepping motors, wherein each stepping motor drives independently each of the indicators (hand 14, 16, rotating disc 17). The stepping motor can be bidirectional, for example, to drive a hand in a retrograde manner. In one particular case, the stepping motor can comprise a double gearbox at 2° and 3° per step, and three simple gearboxes at 6° per step.

The control unit 12 can further comprise a buzzer device 22, for example a piezo controlled by the microcontroller 6, and/or a movement sensor such as an accelerometer (not represented).

In another embodiment, the multi-functional portable device 10 comprises a transmission unit 5 also communicating with the wireless connection module 8. The transmission unit 5 is arranged for transmitting internal information 18 corresponding to an indication of the display module 2, such as the current time, the date, the running reserve etc. The internal information 18 can also correspond to a value calculated and/or memorized during the execution of one or several of the selected functions, for example a lapsed or remaining time, a score, a quantity etc.

In one embodiment, the multi-functional portable device 10 further comprises a storage unit 9 for storing the internal information 18 and/or the external information 7.

In yet another embodiment, the multi-functional portable device 10 comprises a control mechanism of the selected function or functions. Controlling the selected function or functions can include setting the time, adjusting the alarm, parameterizing the stopwatch or others. The control mechanisms can take the shape of conventional pushbuttons and/or crowns or any other form and are designed for controlling the selected function or functions, for example for starting the stopwatch, for activating the countdown etc.

Figure 4:
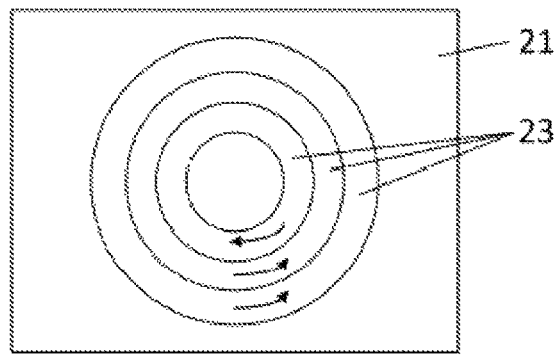
FIG. 4 represents input means of a remote control device.

In one variant embodiment, the control mechanism of the selected function or functions comprises the input means 21 provided on the remote control device 20. In the example of FIG. 4, the control mechanism comprises a touch screen 21 adapted for displaying sensitive graphical elements 23 corresponding to the indicators 14, 15, 16 17 of the display module 2. In particular, the touch screen 21 comprises three sensitive graphical elements 23 in the form of concentric rings, wherein each of the rings 23 corresponds to one of the hands 14, 16 of the display 2. For example, the inner ring can correspond to the hours hand, the middle one to the minutes hand and the outer one to the seconds hand. The users can make each of the corresponding hands 14 move forward or backward by sliding a finger or a stylus on the corresponding graphical element 23 in the corresponding direction. Other display configurations are also possible to control the selected function or functions. The screen 21 can also be used for displaying the internal information 18 transmitted from the multi-functional portable device 10, for example for displaying the current time or the value calculated during the execution of one or several of the selected functions.

An application program can be configured for being executed in the remote control device 20 so as to manage the input of the selection of the function or functions and the generating of the external information 7 associated with the selected function or functions. The application program can also be used for managing the input means 21 and/or generating and processing the internal information 18 transmitted from the multi-functional portable device 10. The application program can be downloaded into a memory, for example in the storage unit 9, in association with the processing device of the remote control device 20. The downloading operation can be achieved by using a reading unit (not represented) such as a CD or DVD medium, USB key or any other type, connected to the remote control device 20. The downloading operation can also be achieved in a wireless manner. In the case where the remote control device 20 is a smartphone, the software can take the shape of a dedicated application program. The software can furthermore be used for managing the peripherals of the control unit 12 and for managing the communication between the control module 6 and the wireless connection module 8. The application program can also be configured to be executed in the multi-functional portable device 10.

It is obvious that the present invention is not limited to the embodiment that has just been described and that various modifications and simple variants can be conceived by the one skilled in the art whilst remaining within the scope of the present invention. For example, the multi-functional portable device 10 can comprise any other portable device having an analog display or any other mechanism driven by an actuator.

In one embodiment, the multi-functional portable device 10 comprises the display module 2 driven by an actuator 3 and configured to be able to display one or more display functions simultaneously or sequentially. The portable device can comprise a timepiece such as a wristwatch, a pocket watch or any other portable device capable of displaying information, such as a pedometer, an activity tracker etc.

The multi-functional portable device 10 also comprises a control unit 12 configured to receive external information 7 and control the display module 2 according to said one or more display functions, based on the received external information 7.

The display module 2 can be of analog or digital type. For example, the display module 2 can comprise one or several mobile indicators. With reference again to FIGS. 3a, 3b, and 3c, the display module 2 comprises hands 14 for indicating the current time, hands 16 for displaying functions such as, for example, setting, countdown, counting and other functions. The display module 2 also comprises rotating disc indicators 17. Each of these mobiles 14, 16, 17 can be driven by an actuator 3, for example a stepping motor, a DC motor or any other actuator whose size and electric consumption make it suitable for use in watchmaking. Other types of indicators can also be conceived for the display module 2, for example roller indicators, electric indicators (e-ink, LCD, LED or OLED), or also hybrid mechanical and electric indicators.

In one embodiment, the wireless connection module 8 includes an antenna comprised in the one or several mobile indicators 14, 16, 17. In the case where the indicator or indicators comprise a hand 14, 16 and/or a rotating disc 17, the latter can serve as antenna.

The multi-functional portable device 10 further includes a computer medium comprising portions of code for a software application comprising a plurality of display functions (for example a library of functions such as those listed above), each of the display functions being configured to be executed in the multifunctional portable device 10.

The multi-functional portable device 10 further comprises selection means for selecting a subgroup of display functions from among the plurality of display functions, so as to generate the external information 7 comprising the subgroup of display functions. The multi-functional portable device 10 further comprises a control mechanism for selecting a predetermined display function from among the subgroup of display functions, so that the control unit 12 can control the display module 2 according to said predetermined display function.

In one embodiment, the timepiece comprises a pushbutton or a crown, for example on the watch middle. The control mechanism can then comprise the pushbutton or the crown, wherein selecting a predetermined display function from among the subgroup of display functions is effected through an action of the user on the pushbutton or the crown. For example, a predetermined display function can be selected from among the subgroup of display functions by two consecutive pressing actions on the pushbutton or the crown.

In one embodiment, the multi-functional portable device 10 includes a remote control device 20 (FIG. 1) that comprises the computer medium. For example, in the case where the remote control device 20 is an intelligent apparatus of the type "smartphone", tablet or other, the computer medium can take the form of an application program installed in the intelligent device.

In this case, the selection means can include input means comprised in the remote control device 20. For example, a touch screen 21 of the remote control device 20 can serve as selection means.

In one embodiment, the computer medium (or application software) is configured for displaying sensitive graphical elements 23 on the touch screen 21 of the remote control device 20. The sensitive graphical elements 23 can be activated by a manual action of a user in order to control the display module 2 when the control unit 12 controls the display module 2 according to said predetermined display function.

Each of the sensitive graphical elements 23 can be associated with one of the indicators 14, 16, 17. In this case, each of the indicators 14, 16, 17 can be controlled by a manual action of a user on the associated sensitive graphical element 23.

According to another embodiment, the display function or functions displayed by the display module 2 depend on the indications supplied by one or several electronic sensors of the portable device, for example, of the watch. Said one or several electronic sensors can comprise, alone or in combination, a temperature sensor for the thermometer function, a magnetic field sensor for the compass and regatta functions, a speed sensor, an accelerometer or a radiolocation interface for the functions of measurement of speed, acceleration, height of jump, navigation and regatta, a GPS receiver or any other geolocation receiver; a pulse sensor for pulse-meter and training monitor functions. Such an electronic sensor can also be arranged for measuring physical or chemical values such as the pulse, glycaemia, pulse oxymetry (SpO2), etc. As described further above, said one or several electronic sensors can be connected to the control unit 12 through the connector 11 and the input or inputs 19. The internal information 18 coming from said one or several electronic sensors can however advantageously interact with the portions of code of an application software so as to generate the external information 7 received in the control unit 12. The interaction of the internal information 18 from said one or several sensors with the portions of code of an application program can also include processing for calculating the values (such as lapsed or remaining time, pulse value, user physical activity level or other) to be displayed within the frame of the function selected on the display module 2.

In one embodiment, a method for controlling the multi-functional portable device 10 comprises the steps of:
  selecting a subgroup of display functions from among the plurality of display functions using the selection means; and
  selecting a predetermined display function from among the subgroup of display functions using the control mechanism so that the control unit 12 controls the display module 2 according to said predetermined display function.

In the variant embodiment where the control mechanism allows to act on the display module 2, the method can also include the step of actuating the control mechanism so as to act on the display module 2 whilst the function of the control unit 12 controls the display module 2 according to said predetermined display function.

In the embodiment where the control mechanism comprises a pushbutton or a crown, selecting the predetermined display function can be achieved by two consecutive pressing actions on the pushbutton or the crown.

In the embodiment where the multi-functional portable device 10 includes a remote control device 20 comprising a touch screen 21 on which are displayed sensitive graphical elements 23, actuating the control mechanism can comprise a manual action of a user in order to control the display module 2 when the control unit 12 controls the display module 2 according to the predetermined display function.

In yet another embodiment, the remote control device 20 comprises visualization means, for example a camera. The display module 2 can then be visualized using the visualization means. A value displayed by the display module 2 can be determined. The value displayed by the display module 2 can then be modified by comparing the displayed value and a predetermined value. By way of illustration, the multi-function portable device 10 can be a watch whose display module 2 comprises hands 14, 16. The position of the hands 14, 16 at a given time can then be recorded by the camera of the remote control device 20. The remote control device 20 or the watch 10 can comprise analysis means for interpreting the position of the hands from the recording and for determining a corresponding display value. It is then possible to modify the value displayed by the display module 2 by comparing the displayed value and a predetermined value. For example, in a synchronization or indexation function of the display 2, the hands can be aligned at "0" (relative to a graduation on the dial) from the position that they had at the moment of recording. In this case, analysis means, for example comprised in the application software, are capable of calculating the difference of position of each hand so as to move them to set them to "0".

REFERENCE NUMBERS USED IN THE FIGURES

2 indicator
3 actuator
4 receiving unit
5 transmission unit
6 control module
7 external information
8 wireless connection module
9 storage unit
10 multi-functional portable device
11 connector
12 control unit
13 power management unit
14 hand
15 opening
16 additional hand
17 rotating disc
18 internal information
19 input
20 remote control device
21 input means
22 buzzer
23 sensitive graphical element

What is claimed is:

1. A system for controlling a multi-functional portable device, the system comprising:
    a remote control device with one or more selection means allowing users to select a plurality of time or non-time display functions the users wish to see executed on the multi-functional portable device and to generate corresponding external information;
    a wireless connection module;
    the multi-functional portable device comprising:
        a display module driven by an actuator and comprising:
            at least one first display of an analog type configured to display the plurality of time display functions and
            at least one second display of an analog type configured to display the plurality of non-time display functions simultaneously with the plurality of time display functions displayed by said at least one first display; and
        a transmission unit communicating with the wireless connection module and configured for transmitting internal information from the multi-functional portable device corresponding to an indication of the display module; and
        a control unit configured to receive external information and control the display module according to said plurality of time or non-time display functions the users wish to see executed on the multi-functional portable device, based on the received external information; and
        a non-transitory computer medium comprising portions of code for a software application comprising a library of functions comprising a plurality of display functions, each of the display functions being configured to be executed by a processor of the multi-functional portable device;
    wherein said selection means is configured for selecting a subgroup of display functions from among the plurality of display functions, such as to generate the external information comprising the subgroup of display functions; and
    wherein said at least one first display of the analog type and said at least one second display of the analog type are driven by the actuator in accordance with the external information such as to display simultaneously said subgroup of display functions.

2. The system for controlling a multi-functional portable device according to claim 1,
    wherein the control unit comprises:
        a control module for controlling the actuator; and
        a receiving unit communicating with the wireless connection module and the control module,
            wherein the receiving unit is configured to receive the external information through the wireless connection module and transmit the external information to the control module.

3. The system for controlling a multi-functional portable device according to claim 1,
    wherein the multi-functional portable device is a timepiece.

4. The system for controlling a multi-functional portable device according to claim 1,
    wherein said plurality of display functions comprise one of the following functions or a combination of these functions: indexing, synchronizing, stopwatch, countdown, wakeup alarm, programmable alarm, time zone, calendar or battery state.

5. The system for controlling a multi-functional portable device according to claim 1,
    wherein the wireless connection module comprises optical or radio wave communication means using a short-range wireless transmission protocol.

6. The system for controlling a multi-functional portable device according to claim 1,
    further comprising a storage unit for storing the internal information and/or the external information.

7. The system for controlling a multi-functional portable device according to claim 1, wherein the remote control device comprises a portable telephone, a PC, a numeric tablet or a console.

8. The system for controlling a multi-functional portable device according to claim 1,
wherein the selection means comprise a touch screen configured for displaying a plurality of sensitive graphical elements that can be actuated by a manual action of a user in order to control the display module when the control unit controls the display module according to said predetermined display function.

9. The system for controlling a multi-functional portable device according to claim 8,
wherein each of the plurality of sensitive graphical elements is associated with one of the indicators, wherein each of the indicators can be controlled by a manual action of a user on the associated sensitive graphical element.

10. The system for controlling a multi-functional portable device according to claim 1,
wherein the plurality of display functions comprises one of the following functions or a combination of these functions: indexing, synchronizing, stopwatch, countdown, wakeup alarm, programmable alarm, time zone, calendar or battery state.

11. The system for controlling a multi-functional portable device according to claim 10,
wherein the plurality of display functions depends on indications supplied by one or several electronic sensors of the multi-functional portable device.

12. The system for controlling a multi-functional portable device according to claim 1,
further comprising a control mechanism for selecting a predetermined display function from among the subgroup of display functions, so that the control unit can control the display module according to said predetermined display function.

13. The system for controlling a multi-functional portable device according to claim 12,
wherein the multi-functional portable device is a timepiece and wherein the control mechanism comprises a pushbutton or a crown of the timepiece.

14. The system for controlling a multi-functional portable device according to claim 13,
wherein the control mechanism can be actuated so as to select the predetermined display function following two consecutive pressing actions on the pushbutton or the crown.

15. The system for controlling a multi-functional portable device according to claim 1,
wherein the display module comprises one or more mobile indicators.

16. The system for controlling a multi-functional portable device according to claim 15,
wherein the wireless connection module includes an antenna comprised in said one or-more mobile indicators.

17. The system for controlling a multi-functional portable device according to claim 15,
wherein each of said one or more mobile indicators comprises at least one hand and/or at least one rotating disc.

18. The system for controlling a multi-functional portable device according to claim 17,
wherein the hand and/or the rotating disc serve as antenna.

19. Method for controlling a multi-functional portable device comprising a display module driven by an actuator and comprising at least one first display of an analog type configured to display a plurality of time display functions and at least one second display of an analog type configured to display a plurality of non-time display functions simultaneously with the plurality of time display functions,
said method using a remote control device with one or more selection means allowing users to select the plurality of time or non-time display functions the users wish to see executed on the multi-functional portable device and to generate corresponding external information; a control unit configured to receive said external information and control the display module according to said plurality of time or non-time display functions the users wish to see executed on the multi-functional portable device, based on the received external information; a wireless connection module; a transmission unit communicating with the wireless connection module and configured for transmitting internal information from the multi-functional portable device corresponding to an indication of the display module; a non-transitory computer medium comprising portions of code for a software application comprising a library of functions comprising a plurality of display functions, each of the display functions being configured to be executed in the multi-functional portable device; selection means for selecting a subgroup of display functions from among the plurality of display functions, so as to generate the external information comprising the subgroup of display functions; and a control mechanism for selecting a predetermined display function from among the subgroup of display functions, so that the control unit can control the display module according to said predetermined display function; the method comprising:
selecting a subgroup of display functions from among the plurality of display functions using the selection means;
selecting a predetermined display function from among the subgroup of display functions using the control mechanism so that the control unit controls the display module according to said predetermined display function.

20. The method according to claim 19,
wherein the multi-functional portable device is a timepiece, wherein the control mechanism comprises a pushbutton or a crown of the timepiece; and
wherein selecting the predetermined display function is achieved by two consecutive pressing actions on the pushbutton or the crown.

21. The method according to claim 19,
wherein the multi-functional portable device further comprises a remote control device comprising visualization means;
wherein the method comprises the steps of visualizing the display module using the visualization means;
of determining a value displayed by the display module;
of modifying the value displayed by the display module by comparing the displayed value and a predetermined value.

22. The method according to claim 21,
wherein the selection means comprise input means comprised within the remote control device, wherein the input means comprise a touch screen configured for displaying a plurality of sensitive graphical elements that can be actuated by a manual action of a user in order to control the display module when the control unit controls the display module according to said predetermined display function;

wherein actuating the control mechanism comprises a manual action of a user in order to control the display module when the control unit controls the display module according to the predetermined display function.

* * * * *